(12) United States Patent
De La Mar et al.

(10) Patent No.: US 10,933,576 B2
(45) Date of Patent: Mar. 2, 2021

(54) APPARATUS AND METHOD FOR APPLYING A GUM STRIP TO AN EDGE OF A CORD REINFORCED PLY

(71) Applicant: VMI Holland B.V., Epe (NL)

(72) Inventors: Lucien De La Mar, Epe (NL); Otte Haitsma, Epe (NL); Ruud Albertus Gerhardus Hesselink, Epe (NL); Kevin Voss, Epe (NL); Jeroen Van Tienhoven, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/481,302

(22) PCT Filed: Jan. 17, 2018

(86) PCT No.: PCT/NL2018/050034
§ 371 (c)(1),
(2) Date: Jul. 26, 2019

(87) PCT Pub. No.: WO2018/139917
PCT Pub. Date: Aug. 2, 2018

(65) Prior Publication Data
US 2020/0282632 A1    Sep. 10, 2020

(30) Foreign Application Priority Data
Jan. 26, 2017   (NL) ..................................... 2018238

(51) Int. Cl.
*B29D 30/44*    (2006.01)
*B29C 63/00*    (2006.01)
*B29C 53/38*    (2006.01)

(52) U.S. Cl.
CPC .......... *B29C 63/0039* (2013.01); *B29C 53/38* (2013.01); *B29D 30/44* (2013.01);
(Continued)

(58) Field of Classification Search
CPC .............. B29C 63/46; B29C 2791/002; B29C 2793/0081; B29C 53/38; Y10T 156/1034
See application file for complete search history.

(56) References Cited

U.S. PATENT DOCUMENTS

| 2,060,269 | A | | 11/1936 | Wikle .............................. 242/65 |
| 3,516,145 | A | | 6/1970 | Villagrasa ................... 29/243.57 |
| 4,406,729 | A | * | 9/1983 | Elias ........................ B29C 63/04 |
| | | | | 156/216 |
| 4,601,689 | A | * | 7/1986 | Finkle ..................... B29C 53/04 |
| | | | | 156/216 |

(Continued)

FOREIGN PATENT DOCUMENTS

| CN | 101090812 | 12/2007 | ............ B29D 30/16 |
| CN | 103228428 | 7/2013 | ............ B29D 30/16 |

(Continued)

OTHER PUBLICATIONS

Grant of Patent for Korean Patent Application No. 10-2018-7021890, dated Jul. 30, 2019 with translation (6 pages).
(Continued)

*Primary Examiner* — Scott W Dodds
(74) *Attorney, Agent, or Firm* — Hayes Soloway P.C.

(57) ABSTRACT

Described is an apparatus and a method for applying a first gum strip to a first edge of a cord reinforced ply, wherein the apparatus includes a ply support for supporting the cord reinforced ply and a first strip support that defines an elongate first strip region extending in the longitudinal direction for supporting the first gum strip with respect to the ply support, and wherein the first strip support includes a first retaining member for retaining a first part of the first gum strip below the first edge and a first folding member that is rotatable with respect to the first retaining member about a first folding axis from a flat position into a folding position opposite to the first retaining member with respect to the support plane for folding a second part of the first gum strip around the first edge.

28 Claims, 7 Drawing Sheets

(52) U.S. Cl.
CPC .......................... *B29C 2791/002* (2013.01);
*B29C 2793/0081* (2013.01); *Y10T 156/1034*
(2015.01)

(56) References Cited

U.S. PATENT DOCUMENTS

| | | | | |
|---|---|---|---|---|
| 5,098,508 A | * | 3/1992 | Mattil | A43D 5/02 |
| | | | | 12/122 |
| 5,590,220 A | | 12/1996 | Takahashi | 382/203 |
| 5,605,596 A | | 2/1997 | McLaughlin | 156/395 |
| 8,887,645 B1 | * | 11/2014 | Semmer | A47B 23/001 |
| | | | | 108/42 |

FOREIGN PATENT DOCUMENTS

| | | | |
|---|---|---|---|
| DE | 202014101731 | 4/2014 | ............ B29D 30/06 |
| EP | 0724951 | 8/1996 | ............ B29D 30/70 |
| GB | 2168645 | 6/1986 | ............ B29C 67/12 |
| JP | H01191320 | 8/1989 | ............... G11B 5/73 |
| JP | H06195513 | 7/1994 | ............... G06K 9/46 |
| JP | 2007269971 | 10/2007 | ................ C08J 3/12 |

OTHER PUBLICATIONS

Written Opinion for Korean Patent Application No. 10-2018-7021890, dated May 30, 2019 with translation (4 pages).
Chinese Office Action (w/translation) issued in application No. 201880007625.7, dated Dec. 13, 2019 (8 pgs).
Japanese Decision to Grant (w/translation) issued in application No. 2019-538500, dated Dec. 23, 2019 (5 pgs).
International Search Report and Written Opinion issued in application No. PCT/NL2018/050034, dated Apr. 19, 2018 (10 pgs).

* cited by examiner

APPARATUS AND METHOD FOR APPLYING A GUM STRIP TO AN EDGE OF A CORD REINFORCED PLY

BACKGROUND

The invention relates to an apparatus and a method for applying a gum strip to an edge of a cord reinforced ply.

U.S. Pat. No. 2,060,269 A discloses an apparatus for applying ribbons to the edges of a tire fabric. The fabric passes through two sets of stitching rollers. Interposed between the sets of stitching rollers are stationary turnover fingers which are positioned at the edges of the fabric and which are shaped to turn the overlapping ribbons up and around the edges of the fabric while the ribbons and the fabric passes said fingers.

GB 2 168 645 A discloses an apparatus for applying an edge strip to a moving ribbon, comprising a fixed folding means that is arranged to fold the edge strip around the edge of the ribbon as the ribbon passes.

EP 0 724 951 A2 discloses a dual gum strip applicator for tire cord belts. The apparatus features reeving the gum strips at least partially around a pair of barrel-shaped rollers which precisely locate the gum strips for subsequent contact with a belt as it moves in a horizontal pathway and providing a specially contoured roller for applying the gum strips to the moving belt.

The known apparatuses all relate to applying gum strips to continuous plies. As such, they all have the drawback that the ribbons or strips are applied to a moving ply. As a consequence, the application is prone to inaccuracies, in particular during lead-in of a new ply.

It is an object of the present invention to provide an alternative apparatus and an alternative method for applying a gum strip to an edge of a cord reinforced ply, wherein the accuracy of the application of the gum strip can be improved.

SUMMARY OF THE INVENTION

According to a first aspect, the invention provides an apparatus for applying a first gum strip to a first edge of a cord reinforced ply, wherein the apparatus comprises a ply support extending in a longitudinal direction and defining a support plane for supporting the cord reinforced ply with the first edge extending in said longitudinal direction along a first folding axis of the apparatus, wherein the apparatus further comprises a first strip support that defines an elongate first strip region extending in the longitudinal direction for supporting the first gum strip with respect to the ply support, wherein the first strip support comprises a first retaining member extending along the first folding axis on the same side of the first folding axis as the ply support for retaining a first part of the first gum strip below the first edge and a first folding member that is rotatable with respect to the first retaining member about the first folding axis from a flat position on the outside of the first retaining member with respect to the ply support into a folding position opposite to the first retaining member with respect to the support plane for folding a second part of the first gum strip around the first edge.

By retaining the first part of the first gum strip in the elongate first strip region below the first edge and by subsequently folding the second part of the first gum strip about the first folding axis around the first edge, the first gum strip can be accurately applied to the first edge. The tire industry is moving towards producing individual cord reinforced plies, rather than a continuous ply. In particular when manufacturing breaker plies, no ply is the same. Hence, the apparatus according to the present invention is particularly accurate when applying the first gum strip around an edge of individually produced cord reinforced ply, rather than a continuous ply as in the prior art.

In an embodiment the first folding member is arranged for folding the second part of the first gum strip simultaneously along the entire elongate first strip region of the first strip support. By folding the first gum strip simultaneously along the entire first strip region, it can be ensured that the first gum strip is uniformly folded along its length.

In a further embodiment the ply support is arranged to remain stationary in the longitudinal direction during the folding. Hence, the position of the cord reinforced ply can be kept constant during the folding, thereby increasing the accuracy of the folding.

In another embodiment the first folding axis extends in the support plane or within a range of zero to five millimeters above or below said support plane. By locating the first folding axis in, at or near the support plane, the first gum strip can be folded tightly around the first edge at the support plane.

In an embodiment thereof the ply support is arranged for receiving the cord reinforced ply with the first edge coinciding with the first folding axis or extending along said first folding axis within a range of zero to three millimeters from said first folding axis. By locating the first edge at or near the first folding axis, the first gum strip can be folded tightly around the first edge at said first folding axis.

In an embodiment the apparatus comprises a first drive mechanism for driving the rotation of the first folding member with respect to the first retaining member about the first folding axis. Preferably, the first drive mechanism is spaced apart from the first folding axis in a circumferential direction about said first folding axis. With the first drive mechanism not extending at the first folding axis, the first folding axis can be located as close as possible to the first edge.

In a further embodiment thereof the first drive mechanism comprises an actuator and a linkage assembly that connects the actuator to the first folding member for converting an output of the actuator into a rotation of the first folding member about the first folding axis. The linkage can effectively be used to convert the rotary motion of the motor into the required rotary folding motion of the first folding member.

In an embodiment the first strip support with the first folding member in the flat position is recessed from the support plane over a first spacing distance. At said first spacing distance, the first folding member is arranged for supporting the first gum strip below the support plane, preferably flush with the first retaining member.

In an embodiment thereof the first folding member is spaced apart from the first folding axis over said first spacing distance in a circumferential direction about the first folding axis in the flat position, the folding position and during the rotation between the flat position and the folding position. Hence, the first folding member can be kept free from the first folding axis throughout its folding motion, thereby allowing for the folding of the first gum strip accurately and tightly around the first edge of the cord reinforced ply.

In a further embodiment thereof the first retaining member is movable in a recessing direction between a first retaining position in which the first retaining member is recessed with respect to the support plane over the first spacing distance and a second retaining position in which the first retaining member is recessed with respect to the support plane over a second spacing distance that is larger than the first spacing distance. By recessing the first retaining member, differences and/or variations in the thickness of the first gum strip, the cord reinforced ply and/or both can be compensated for during the folding.

In an embodiment thereof the first strip support comprises a retaining drive for moving the first retaining member in a stitching direction opposite to the recessing direction. Hence, the first retaining member can be actively driven into stitching abutment with the first gum strip to ensure a tight adherence of said first gum strip to the cord reinforced ply.

In an embodiment the first folding member comprises a single folding body extending in the longitudinal direction along the entire elongate first strip region of the first strip support. By using a single folding body, the folding body as a whole can be rotated easily and/or uniformly along the entire length of the first folding member.

In an embodiment the first retaining member comprises a retaining body and one or more first retaining elements for retaining the first part of the first gum strip to said retaining body. Preferably, the one or more first retaining elements are vacuum retaining elements. The first retaining elements can reliably retain the first gum strip, thereby increasing the accuracy of the positioning of the first gum strip during the folding.

In an embodiment the first folding member comprises a folding body and one or more second retaining elements for retaining the second part of the first gum strip to said folding body. Preferably, the one or more second retaining elements are vacuum retaining elements. The second retaining elements can reliably retain the first gum strip, thereby increasing the accuracy of the positioning of the first gum strip during the folding.

In an embodiment the ply support comprises one or more third retaining elements for retaining the cord reinforced ply in the support plane on the first part of the first gum strip. Preferably, the one or more third retaining elements are magnetic retaining elements. The third retaining elements can reliably retain the cord reinforced ply with respect to the first gum strip during the folding.

In an embodiment the cord reinforced ply has a second edge parallel and opposite to the first edge, wherein the apparatus is further arranged for applying a second gum strip to said second edge along a second folding axis of the apparatus, wherein the apparatus further comprises a second strip support that defines an elongate second strip region extending in the longitudinal direction for supporting the second gum strip below the second edge at the second folding axis, wherein the second strip support comprises a second retaining member extending along the second folding axis on the same side of the second folding axis as the ply support for retaining a first part of the second gum strip below the second edge and a second folding member that is rotatable with respect to the second retaining member about the second folding axis from a flat position on the outside of the second retaining member with respect to the ply support into a folding position opposite to the second retaining member with respect to the support plane for folding a second part of the second gum strip around the second edge. Hence, both the first gum strip and the second gum strip can be accurately folded around the first edge and the second edge, respectively.

In an embodiment thereof the first strip support and the second strip support are movable relative to each other in a lateral direction parallel to the support plane and transverse or perpendicular to the longitudinal direction. Hence, the distance and/or the width between the first strip support and the second strip support in the lateral direction can be adjusted, e.g. to position the first gum strip and the second gum strip with respect to cord reinforced plies of different widths.

In an embodiment thereof the ply support has a width in the lateral direction that is adjustable in response to the movement of the first strip support and the second strip support in said lateral direction. Hence, the width of the ply support in the lateral direction can be adjusted, e.g. to facilitate supporting cord reinforced plies of different widths.

In an embodiment thereof the ply support comprises a plurality of ply support members extending in the longitudinal direction, wherein said ply support members are distributed in the lateral direction between the first strip support and the second strip support to define the support plane for the cord reinforced ply, wherein the ply support members are movable towards and away from each other in the lateral direction. By providing a plurality of ply support members with intermediate space, the spacing between the ply support members can be reduced, thereby adjusting the overall width of the ply support.

In an embodiment thereof the ply support members are evenly distributed and remain evenly distributed between the first strip support and the second strip support when moving towards and away from each other in the lateral direction. Hence, cord reinforced plies of different widths can be reliably supported on the ply support regardless of the adjustable width.

According to a second aspect, the invention provides a method for applying a first gum strip to a first edge of a cord reinforced ply with the use of the aforementioned apparatus, wherein the method comprises the steps of:

receiving the first gum strip at the elongate first strip region on the first strip support;

supporting the cord reinforced ply with the first edge extending in the longitudinal direction along the first folding axis of the apparatus;

wherein the first part of the first gum strip is retained by the first retaining member below the first edge and the first folding member is rotated with respect to the first retaining member about the first folding axis from a flat position on the outside of the first retaining member with respect to the ply support into a folding position opposite to the first retaining member with respect to the support plane, thereby folding the second part of the first gum strip around the first edge.

In an embodiment of the method the first folding member folds the second part of the first gum strip simultaneously along the entire elongate first strip region of the first strip support.

Again, by retaining the first part of the first gum strip in the elongate first strip region below the first edge and by subsequently folding the second part of the first gum strip about the first folding axis around the first edge, the first gum strip can be accurately applied to the first edge.

In a further embodiment of the method the ply support remains stationary in the longitudinal direction during the folding. Hence, the position of the cord reinforced ply can be kept constant during the folding, thereby increasing the accuracy of the folding.

In an embodiment of the method, the cord reinforced ply has a second edge parallel and opposite to the first edge, wherein the method further comprises the step of applying a second gum strip to said second edge along a second folding axis of the apparatus. Hence, both the first gum strip and the second gum strip can be accurately folded around the first edge and the second edge, respectively.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-4 show an apparatus 1 according to an exemplary embodiment of the invention for applying a first gum strip 91 and a second gum strip 92 to a cord reinforced ply 8. Said cord reinforced ply 8 comprises a ply body 80 with a top 81, a bottom 82, a first edge 83 and a second edge 84. The cord reinforced ply 8 is provided with reinforcement cords (not shown), e.g. steel reinforcement cords, embedded in the ply body 80. The reinforcement cords are at least partially exposed at the first edge 83 and the second edge 84 because of the way the cord reinforced ply 8 has been cut. The apparatus 1 is arranged for folding the first gum strip 91 around the first edge 83 and the second gum strip 92 around the second edge 84 about a first folding axis F1 and a second folding axis F2, respectively, to cover said exposed reinforced cords.

The apparatus 1 comprises a base 2 for placing the apparatus 1 on the ground, a ply support 3 for supporting the cord reinforced ply 8 in a support plane P with respect to the base 2, a first strip support 4 for supporting the first gum strip 91 in an elongate first strip region S1 along the first folding axis F1 and a second strip support 5 for supporting the second gum strip 92 in an elongate second strip region S2 along the second folding axis F2. The first folding axis F1 and the second folding axis F2 are arranged to extend in the support plane P or within a range of zero to five millimeters above or below said support plane P. Preferably, the first strip support 4 and the second strip support 5 are arranged for supporting the first gum strip 91 and the second gum strip 92 just below the support plane P below the first edge 83 and the second edge 84, respectively, of the cord reinforced ply 8.

Figure 1:
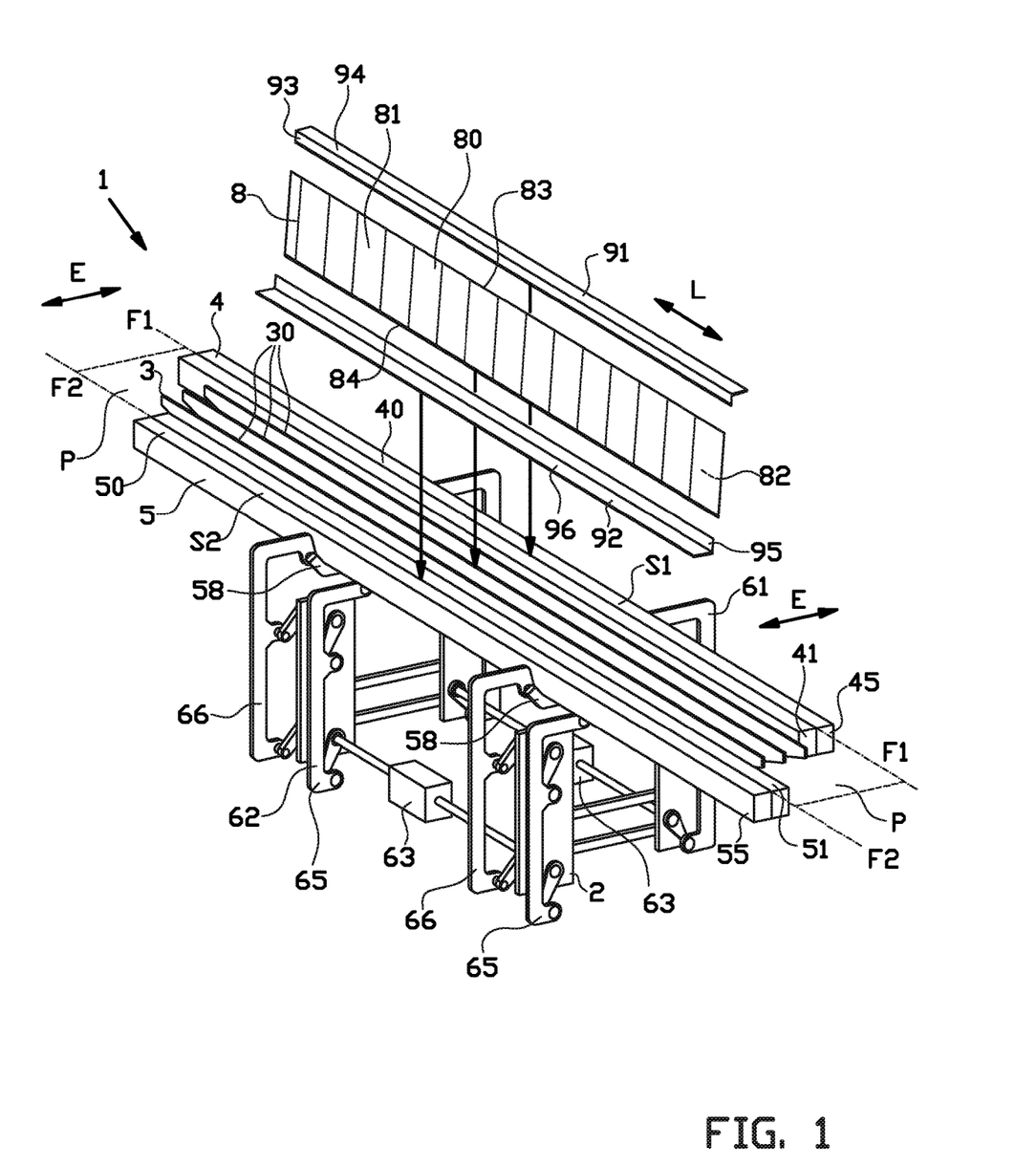
FIG. 1 shows an isometric view of an apparatus according to the invention for applying a first gum strip and a second gum strip to a cord reinforced ply.

As shown in FIG. 1, the ply support 3 extends in a longitudinal direction L, parallel to and between the first folding axis F1 and the second folding axis F2, to define a support plane P for supporting the cord reinforced ply 8 with respect to the base 2. The ply support 3 is arranged for receiving the cord reinforced ply 8 with the first edge 83 and the second edge 84 thereof extending in the longitudinal direction L along the first folding axis F1 and the second folding axis F2, respectively. Preferably, the first edge 83 and the second edge 84 are arranged to coincide with or extend within a range of zero to three millimeters from said respective folding axes F1, F2. The ply support 3 is arranged to be stationary and/or to keep the cord reinforced ply 8 stationary in the longitudinal direction L during the folding. In this exemplary embodiment, the ply support 3 comprises a plurality of ply support members 30 extending parallel to each other in the longitudinal direction L. The ply support members 30 are distributed, preferably evenly, in a lateral direction E between the first strip support 4 and the second strip support 5 to define the support plane P for the cord reinforced ply 8. The ply support members 30 are movable towards and away from each other in the lateral direction E in a manner that will be described in more detail hereafter.

The first strip support 4 comprises a first retaining member 41 extending in the longitudinal direction L along the first folding axis F1 on the same side of the first folding axis F1 as the ply support 3 for retaining a first part 93 of the first gum strip 91 at the bottom 82 of the cord reinforced ply 8.

In this example, the first retaining member 41 comprises an elongate retaining body 42 extending in the longitudinal direction L along the first folding axis F1 and one or more first retaining elements 43 for securely retaining the first part 93 of the first gum strip 91 to said retaining body 42. The elongate retaining body 42 preferably extends in the longitudinal direction L along the entire first strip region S1 to retain the first part 93 of the first gum strip S1 along said entire first strip region S1. The first retaining elements 43 are vacuum retaining elements to retain the first part 93 of the first gum strip 91 through suction.

Figure 5:
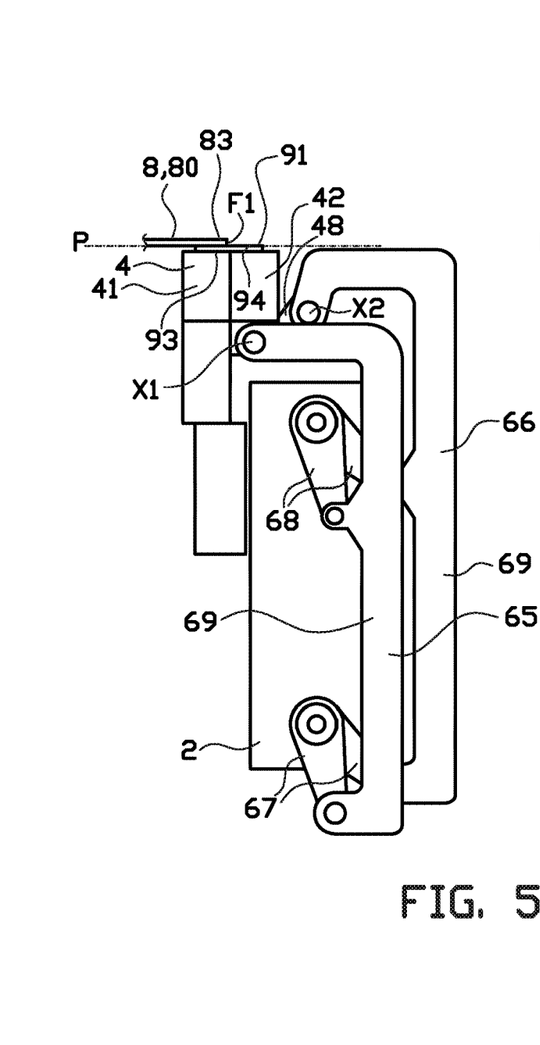
FIGS. 5, 6 and 7 show the steps of folding the first gum strip about one of the edges of the cord reinforced ply.
Figure 6:
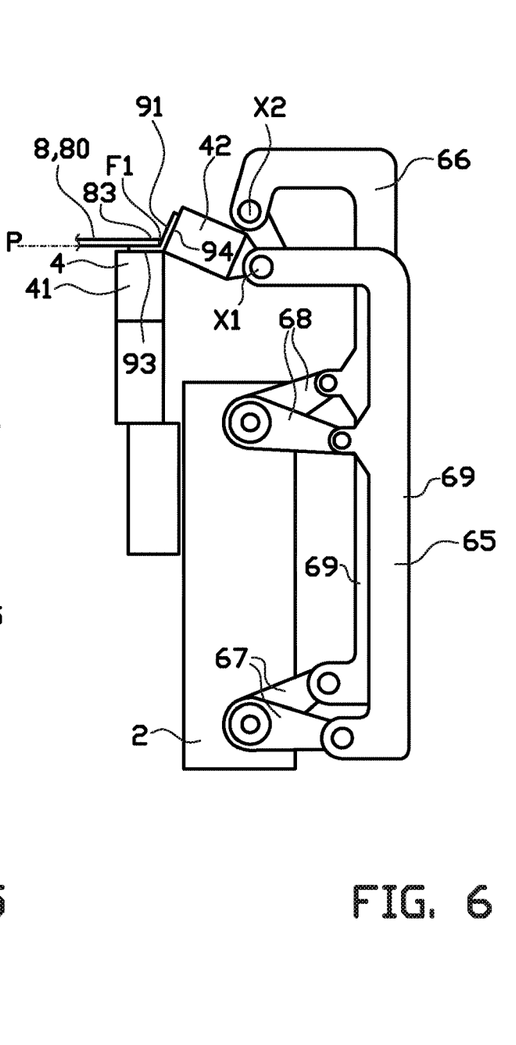
Figure 7:
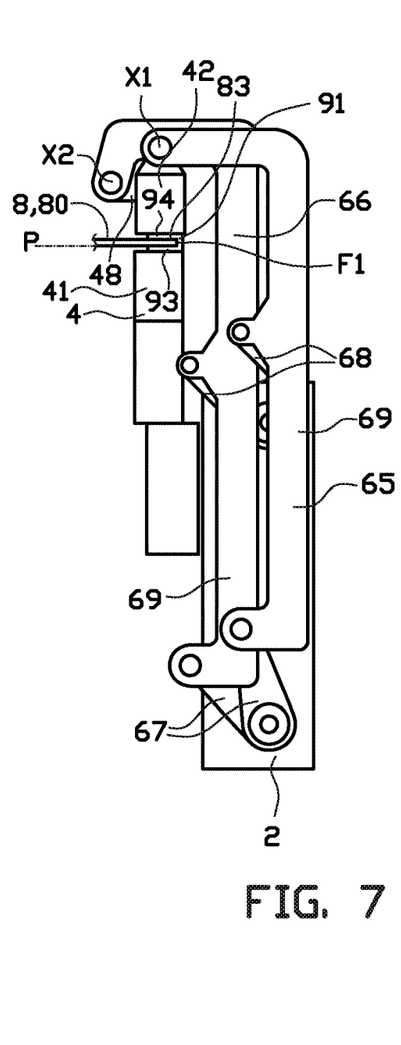
Figure 8A:
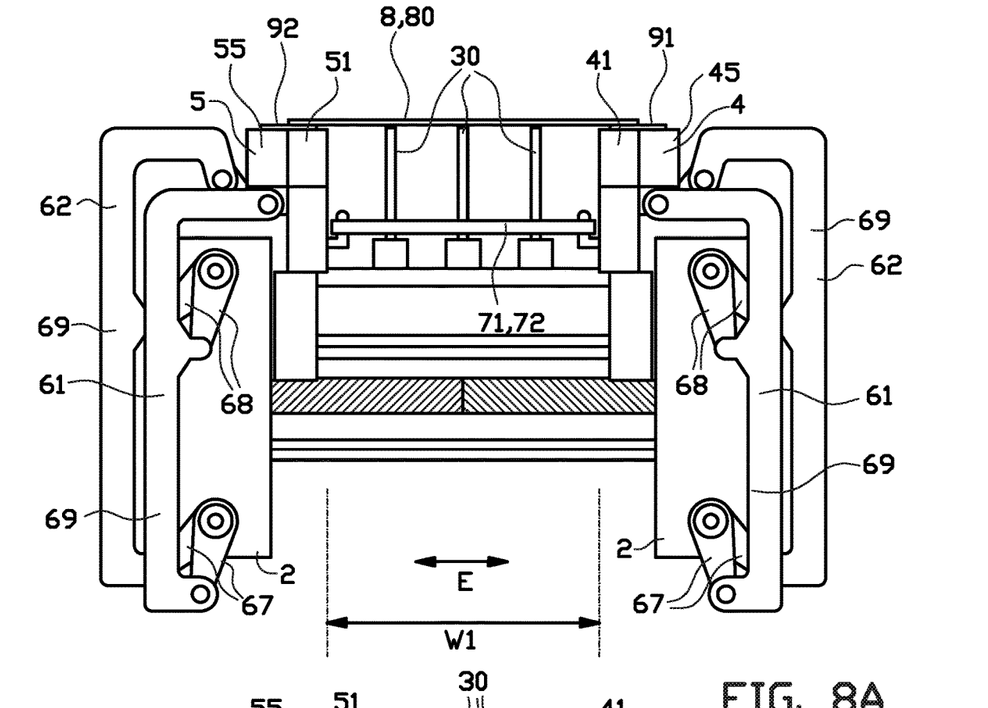
FIGS. 8A and 8B show a front view and a top view, respectively, of the apparatus of FIG. 1 set at a first adjustable width.
Figure 8B:
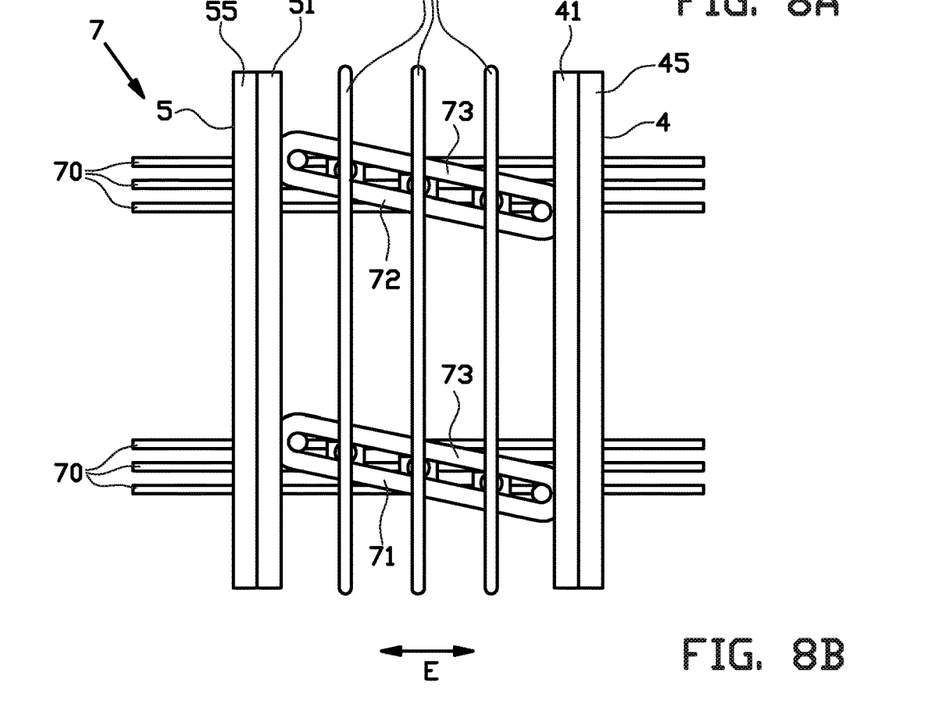
Figure 9A:
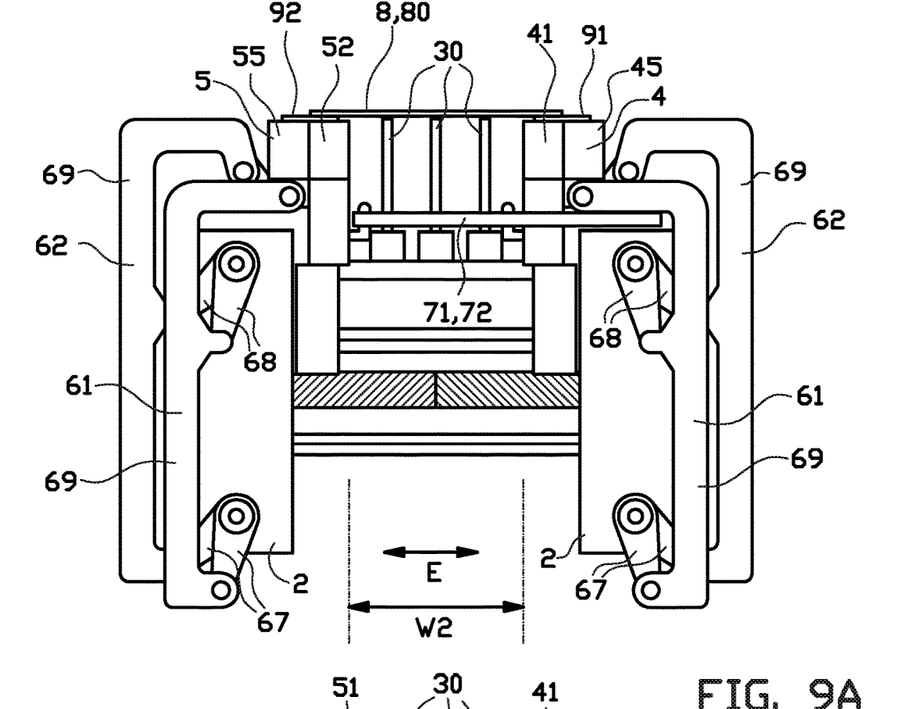
FIGS. 9A and 9B show a front view and a top view, respectively, of the apparatus of FIG. 1 set at a second adjustable width.
Figure 9B:
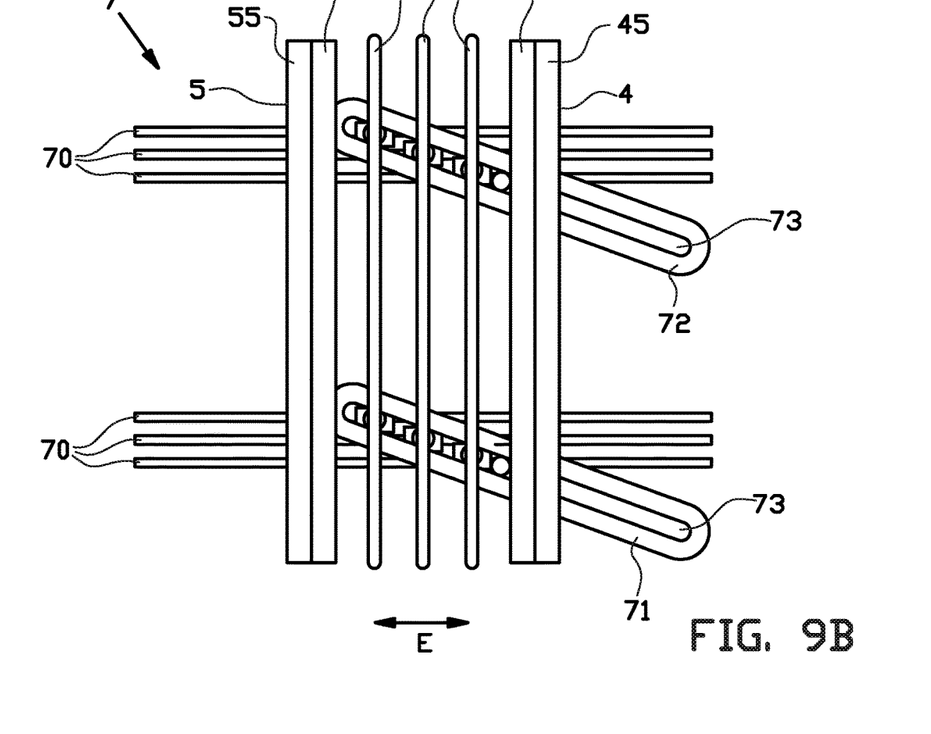

The first strip support 4 further comprises a first folding member 45 that is rotatable with respect to the first retaining member 41 about the first folding axis F1 from a flat position, as shown in FIG. 5, through the intermediate position, as shown in FIG. 6, into a folding position, as shown in FIG. 7. In the flat position, the first folding member 45 is located on the outside of the first retaining member 41 with respect to the ply support 3. More in particular, the first folding member 45 is located adjacent to and at the same side of the support plane P as the first retaining member 41. Preferably, the first folding member 45 and the first retaining member 41 are arranged to be substantially flush to each other on opposite sides of the first folding axis F1. In said flat position, the first folding member 45 is arranged for supporting a second part 94 of the first gum strip 91 at the opposite side of the first folding axis F1 with respect to the first part 93 of the first gum strip 91 at the first retaining member 41. In the folding position, the first folding member 45 is opposite to the first retaining member 41 with respect to the support plane P for folding the second part 94 of the first gum strip 91 about the first folding axis F1 around the first edge 83.

Figure 4:
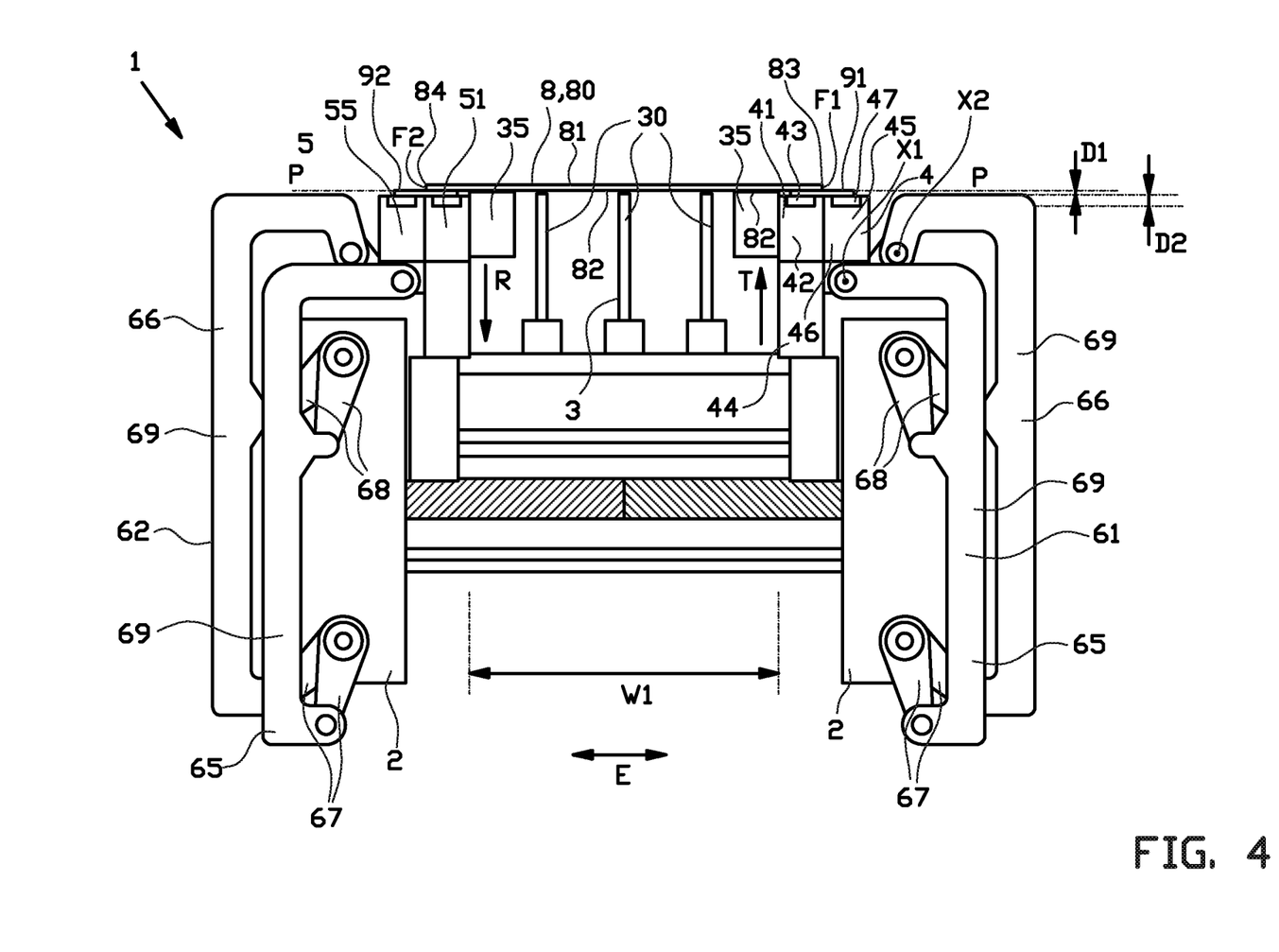
FIG. 4 shows a front view of the apparatus according to FIG. 3.

As shown in FIG. 4, the first folding member 45 is recessed in the flat position from the support plane over a first spacing distance D1. The first folding member remains spaced apart from the first folding axis F1 over said first spacing distance D1 in a circumferential direction about the first folding axis F1 in the flat position, the folding position and during the rotation between the flat position and the folding position.

The first retaining member 41 is movable in a recessing direction R between a first retaining position, as shown in FIG. 4, in which the first retaining member 41 is recessed with respect to the support plane P over the first spacing distance D1 and a second retaining position in which the first retaining member 41 is recessed with respect to the support plane P over a second spacing distance D2 that is larger than the first spacing distance D1. The first strip support 4 comprises a retaining drive 44 for moving the first retaining member 41 in a stitching direction T opposite to the recessing direction R. Said retaining drive 44 may be an actively controlled drive or a passive element, e.g. a biasing element. The apparatus 1 may be provided with a stop surface (not shown) to stop the movement of the retaining member 41 in the stitching direction T at an appropriate minimum spacing distance from the support plane P.

By allowing the first retaining member 41 to be recessed with respect to the support plane P, the position of the first retaining member 41 can be adjusted with respect to the first folding member 45, e.g. in response to thickness variations of the cord reinforced ply or in response to the folding. By driving, urging or biasing the retaining member 41 back into the stitching direction T, it can be ensured that the first gum strip 91 is reliably stitched to the cord reinforced ply 8 in said stitching direction T. The force by which the retaining drive 44 drives the first retaining member 41 against the first gum strip 91 in the stitching direction T may be an adjustable force.

In this example, the first folding member 45 comprises an elongate folding body 46 extending in the longitudinal direction L along the first folding axis F1 and one or more second retaining elements 47 for securely retaining the second part 94 of the first gum strip 91 to said folding body 46. The elongate folding body 46 preferably extends in the longitudinal direction L along the entire first strip region S1 to retain the second part 94 of the first gum strip S1 along said entire first strip region S1. The second retaining elements 47 are vacuum retaining elements to retain the second part 94 of the first gum strip 91 through suction.

The first folding member 45 is arranged for folding the second part 94 of the first gum strip 91 simultaneously along the entire elongate first strip region S1 of the first strip support 4.

As best seen in FIG. 4, the ply support 3 comprises one or more third retaining elements 35 for retaining the cord reinforced ply 8 in the support plane P on the first part 93 of the first gum strip 91. Said one or more third retaining elements 35 are preferably magnetic retaining elements 35 that hold the cord reinforced ply 8 by magnetically attracting the ferromagnetic reinforcement cords in the cord reinforced ply 8. In this exemplary embodiment, the one or more third retaining elements 35 are arranged adjacent to and/or near to the first retaining member 41 so that the cord reinforced ply 8 can be pulled securely onto the first part 93 of the first gum strip 9 at said first retaining member 41.

The second strip support 5 comprises a second retaining member 51 and a second folding member 55 similar to the first retaining member 41 and the first folding member 45, respectively, of the first strip support 4. The retaining member 51 and the second folding member 55 contain the same parts that, apart from being mirrored to the first retaining member 41 and the first folding member 45, function in the same way to retain a first part 95 of the second gum strip 92 and to fold a second part 96 of the second gum strip 92 about the second folding axis F2 around the second edge 84 of the cord reinforced ply 8. The parts of the second retaining member 51 and the second folding member 55 will therefore not be described in detail.

The apparatus 1 comprises a first drive mechanism 61 for driving the rotation of the first folding member 45 with respect to the first retaining member 41 about the first folding axis F1. The first drive mechanism 61 is spaced apart from the first folding axis F1 in a circumferential direction about said first folding axis F1, thus keeping said first folding axis F1 clear of any physical parts of the first drive mechanism 61. Hence, the first folding axis F1 can be positioned as close as possible to first edge 83 of the cord reinforced ply 8 to ensure that the first gum strip 91 can be folded tightly around said first edge 83.

In this exemplary embodiment, the first drive mechanism 61 comprises an actuator 63 that is arranged for outputting a motion, preferably a rotary motion, and a linkage assembly 64 that connects the actuator 63 to the first folding member 45 for converting the output of the actuator 63 into a rotation of the first folding member 45 about the first folding axis F1. More specifically, the first folding member 45 is provided with a lever 48 that extends in towards the linkage assembly 64 and the linkage assembly comprises a first linkage 65 and a second linkage 66 which are arranged to engage the first folding member 45 at a first link position X1 and a second link position X2, respectively, which are spaced apart such that the individual movements of the first linkage 65 and the second linkage 66 acting on the lever 48 cause the rotation of the first folding member 45 about the first folding axis F1.

As shown in FIGS. 5, 6 and 7, the first linkage 65 and the second linkage 66 each comprise a first crank 67, a second crank 68 and a link member 69 that together with the base 2 form a parallelogram linkage. The parallelogram linkage can be used to effectively impose the rotation of one of the cranks 67, 68 onto the first folding member 45.

The apparatus 1 is provided with a second drive mechanism 62 at the opposite side of the apparatus 1 for driving the rotation of the second folding member 55 with respect to the second retaining member 51 about the second folding axis F2. The second drive mechanism 62 contains the same parts that, apart from being mirrored to the first drive mechanism 61, function in the same way. The parts of the second drive mechanism 62 will therefore not be described in detail.

It is envisioned that the drive mechanisms 61, 62 may be adapted such that the respective folding axes F1, F2 move and/or translate slightly during the folding. This translation of the folding axes F1, F2 during the folding results in the respective folding members 45, 55 following a more complex trajectory that not only includes a rotation about the respective folding axes F1, F2, but also a translation in a direction transverse or perpendicular to said folding axes F1, F2. Hence, the complex trajectory may be an elliptical trajectory. The complex trajectory may be adapted to take into account the thickness of the cord reinforced ply 8, the thickness of the gum strips 91, 92 or both.

As mentioned before, the ply support members 30 are movable towards and away from each other in the lateral direction E to span an adjustable width between the first strip support 4 and the second strip support 5. As shown in FIGS. 8A, 8B, 9A and 9B, the ply support members 30 are movable in said lateral direction E to adjust the width of the support plane P between a first width W1 and a second width W2 smaller than the first width W1. Simultaneously, the first strip support 4 and the second strip support 5 are movable in said lateral direction E to match the respective positions of the strip support regions S1, S2 to the adjusted width W1, W2. Hence, width W1, W2 of the apparatus 1 can be easily adjusted to accommodate smaller or larger cord reinforced plies (not shown).

Preferably, the ply support members 30 are evenly distributed and remain evenly distributed between the first strip support 4 and the second strip support 5 when moving towards and away from each other in the lateral direction E. In this exemplary embodiment, the apparatus 1 comprises a spacing mechanism 7 for driving the movement of the respective ply support members 30 in the lateral direction E. The spacing mechanism 7 comprises a plurality of guide rails 70 extending in said lateral direction E for slidably supporting the ply support members 30 in said lateral direction E. The spacing mechanism 7 further comprises one or more slide bars 71, 72 extending under an oblique angle to the lateral direction E. Each slide bar 71, 72 is provided with a slot 73 that slidably engages with each of the ply support members 30, the first strip support 4 and the second strip support 5. As the strip supports 4, 5 are moved with respect to each other in the lateral direction E, the slide bars 71, 72 slide along the first strip support 4 and the second strip 5 and assume a different oblique orientation with respect to the lateral direction E as a result thereof. The difference in the obliqueness causes the ply support members 30 to move over their respective guide rails 70 in the lateral direction E towards or away from each other.

The method for applying the first gum strip 91 and the second gum strip 92 to the first edge 83 and the second edge 84, respectively, of the cord reinforced ply 8, will be elucidated hereafter with reference to FIGS. 1-7.

Figure 2:
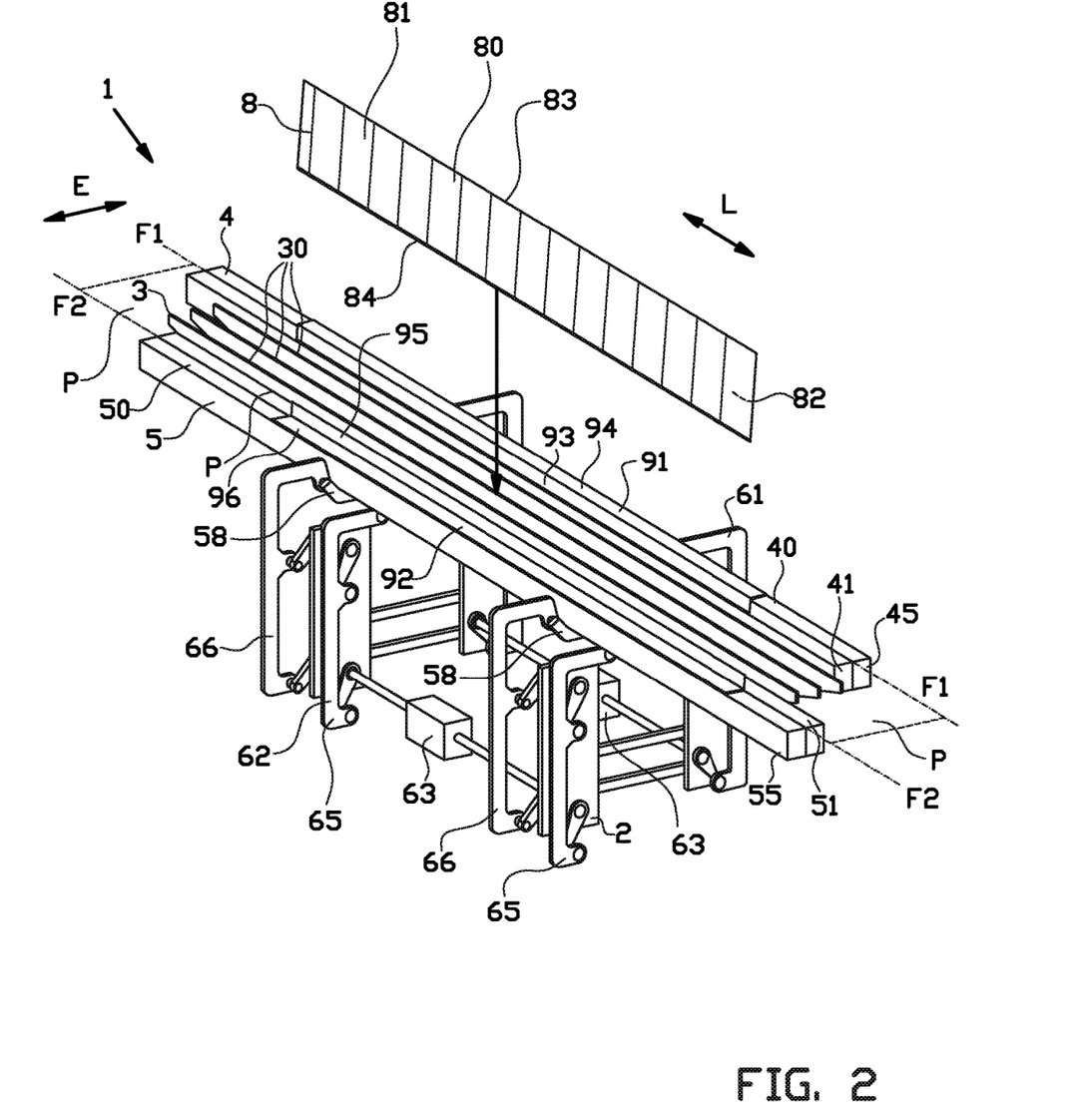
FIG. 2 shows an isometric view of the apparatus of FIG. 1 with the gum strips supported on the apparatus.

FIG. 1 shows the situation prior to the placement of the cord reinforced ply 8 and the gum strips 91, 92 onto the apparatus 1. The folding members 45, 55 are in the flat position flush with the retaining members 41, 51. FIG. 2 shows the situation in which the first gum strip 91 and the second gum strip 92 have been placed at the first strip region S1 defined by the first strip support 4 and at the second strip region S2 defined by the second strip support 5, respectively. The first parts 93, 95 of the gum strips 91, 92 have been placed on the respective retaining members 41, 51, while the second parts 94, 96 of the gum strips 91, 92 have been placed on the respective folding members 45, 55.

In this exemplary embodiment, the gum strips 91, 92 have been cut in an upstream cutting station (not shown) to have V-shaped ends. Said V-shaped ends are dimensioned to match the angle of the leading end and the trailing end of the cord reinforced ply 8 after the folding. In particular, the first part 93 and the second part 94 of the first gum strip 91 and the first part 95 and the second part 96 of the second gum strip 92 each have a different angle that is arranged to be aligned with the angle of the cord reinforced ply 8 after folding. It will be apparent to one skilled in the art that other shapes of the gum strips 91, 92, such as asymmetric V-shapes, linear shapes or non-linear shapes may also be possible depending on the requirements of the folding.

Figure 3:
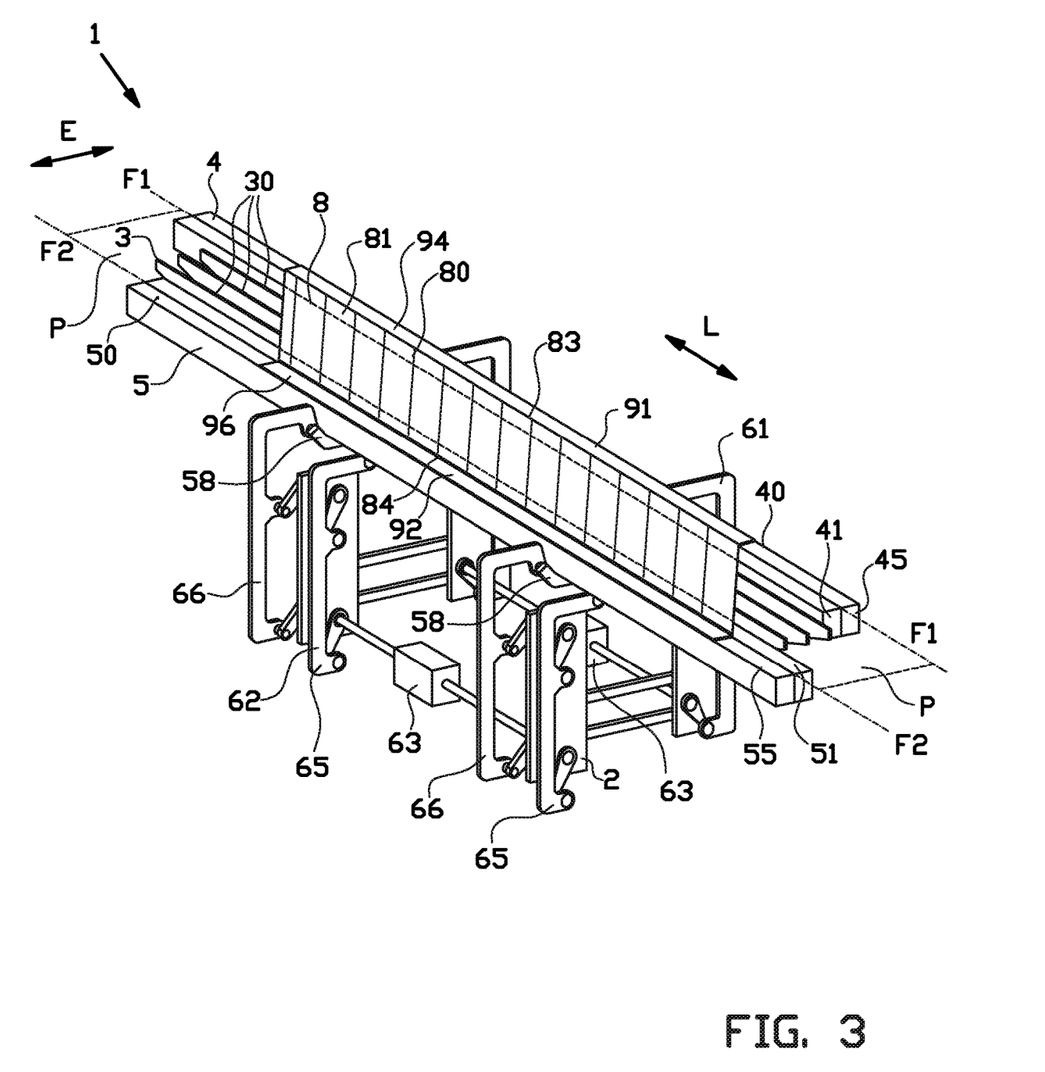
FIG. 3 shows an isometric view of the apparatus of FIG. 1 with the gum strips and the cord reinforced ply supported on the apparatus.

With the first gum strip 91 and the second gum strip 92 supported on the respective strip supports 4, 5, the cord reinforced ply 8 is received at the ply support plane P defined by the ply support 3, as shown in FIG. 3. The cord reinforced ply 8 is arranged with the first edge 83 and the second edge 84 on top of the first part 93 of the first gum strip 91 and the first part 95 of the second gum strip 92, respectively. The second part 94 of the first gums trip 91 and the second part 96 of the second gum strip 92 protrude from underneath and/or extend outside of the cord reinforced ply 8 at the first folding member 45 and the second folding member 55, respectively.

As shown in FIG. 4, the first parts 93, 95 of the gum strips 91, 92 are now retained by the one or more first retaining elements 43 at the respective retaining members 41, 51. The second parts 94, 96 of the gum strips 91, 92 are retained by the one or more second retaining elements 47 at the respective folding members 45, 55. The cord reinforced ply 8 is retained to the first gum strip 91 and the second gum strip 92 by the third retaining elements 35. Hence, both the cord reinforced ply 8 and the gums strips 91, 92 are fully retained. The apparatus 1 is now ready for folding the first gum strip 91 and the second gum strip 92 around the first edge 83 and the second edge 84, respectively.

FIGS. 5, 6 and 7 show the steps of folding the first gum strip 91 around the first edge 83. The second gum strip 92 is folded around the second edge 84 at the opposite side of the cord reinforced ply 8 in the same manner. Preferably, both gum strips 91, 92 are folded simultaneously. Referring to FIG. 5, this situation corresponds to the situation prior to the folding, as shown in FIG. 4, with the first folding member 45 in the flat position flush or substantially flush with the first retaining member 41. FIG. 6 shows the situation after the first drive mechanism 61 has been actuated to rotate the first folding member 45 in a rotation about the first folding axis F1 towards the folding position of FIG. 7. The second part 94 of the first gum strip 91 that is supported on and/or retained to the first folding member 45 is already in the process of being folded around the first edge 83 of the cord reinforced ply 8. As can be seen in FIG. 6, the first folding axis F1 is located at or coincides with the first edge 83, so that the first gum strip 91 may be folded tightly around said first edge 83. FIG. 7 shows the situation after the folding has been completed. The second part 94 of the first gum strip 91 has now been folded around the first edge 83 of the cord reinforced ply 8 and now lies on the top 81 of the cord reinforced ply 8. This folding process is repeated or performed simultaneously for the second gum strip 92 at the second edge 84 of the cord reinforced ply 8.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary the invention relates to an apparatus and a method for applying a first gum strip to a first edge of a cord reinforced ply, wherein the apparatus comprises a ply support for supporting the cord reinforced ply and a first strip support that defines an elongate first strip region extending in the longitudinal direction for supporting the first gum strip with respect to the ply support, wherein the first strip support comprises a first retaining member for retaining a first part of the first gum strip below the first edge and a first folding member that is rotatable with respect to the first retaining member about a first folding axis from a flat position into a folding position opposite to the first retaining member with respect to the support plane for folding a second part of the first gum strip around the first edge.

The invention claimed is:

1. An apparatus for applying a first gum strip to a first edge of a cord reinforced ply, wherein the apparatus comprises a ply support extending in a longitudinal direction (L) and defining a support plane (P) for supporting the cord reinforced ply with the first edge extending in said longitudinal direction (L) along a first folding axis (F1) of the apparatus, wherein the apparatus further comprises a first strip support that defines an elongate first strip region (S1) extending in the longitudinal direction (L) for supporting the first gum strip with respect to the ply support, wherein the first strip support comprises a first retaining member extending along the first folding axis (F1) on the same side of the first folding axis (F1) as the ply support for retaining a first part of the first gum strip below the first edge and a first folding member that is rotatable with respect to the first retaining member about the first folding axis (F1) from a flat position on the outside of the first retaining member with respect to the ply support into a folding position opposite to the first retaining member with respect to the support plane (P) for folding a second part of the first gum strip around the first edge.

2. The apparatus according to claim 1, wherein the first folding member is arranged for folding the second part of the first gum strip simultaneously along the entire elongate first strip region (S1) of the first strip support.

3. The apparatus according to claim 1, wherein the ply support is arranged to remain stationary in the longitudinal direction (L) during the folding.

4. The apparatus according to claim 1, wherein the first folding axis (F1) extends in the support plane (P) or within a range of zero to five millimeters above or below said support plane (P).

5. The apparatus according to claim 4, wherein the ply support is arranged for receiving the cord reinforced ply with the first edge coinciding with the first folding axis (F1) or extending along said first folding axis (F1) within a range of zero to three millimeters from said first folding axis (F1).

6. The apparatus according to claim 1, wherein the apparatus comprises a first drive mechanism for driving the rotation of the first folding member with respect to the first retaining member about the first folding axis (F1).

7. The apparatus according to claim 6, wherein the first drive mechanism is spaced apart from the first folding axis (F1) in a circumferential direction about said first folding axis (F1).

8. The apparatus according to claim 6, wherein the first drive mechanism comprises an actuator and a linkage assembly that connects the actuator to the first folding member for converting an output of the actuator into a rotation of the first folding member about the first folding axis (F1).

9. The apparatus according to claim 1, wherein the first strip support with the first folding member in the flat position is recessed from the support plane (P) over a first spacing distance (D1).

10. The apparatus according to claim 9, wherein the first folding member is spaced apart from the first folding axis (F1) over said first spacing distance (D) in a circumferential direction about the first folding axis (F1) in the flat position, the folding position and during the rotation between the flat position and the folding position.

11. The apparatus according to claim 9, wherein the first retaining member is movable in a recessing direction (R) between a first retaining position in which the first retaining member is recessed with respect to the support plane (P) over the first spacing distance (D1) and a second retaining position in which the first retaining member is recessed with respect to the support plane (P) over a second spacing distance (D2) that is larger than the first spacing distance (D1).

12. The apparatus according to claim 11, wherein the first strip support comprises a retaining drive for moving the first retaining member in a stitching direction (T) opposite to the recessing direction (R).

13. The apparatus according to claim 1, wherein the first folding member comprises a single folding body extending in the longitudinal direction (L) along the entire elongate first strip region (S1) of the first strip support.

14. The apparatus according to claim 1, wherein the first retaining member comprises a retaining body and one or more first retaining elements for retaining the first part of the first gum strip to said retaining body.

15. The apparatus according to claim 1, wherein the first folding member comprises a folding body and one or more second retaining elements for retaining the second part of the first gum strip to said folding body.

16. The apparatus according to claim 1, wherein the ply support comprises one or more third retaining elements for retaining the cord reinforced ply in the support plane (P) on the first part of the first gum strip.

17. The apparatus according to claim 14, wherein the one or more first retaining elements are vacuum retaining element.

18. The apparatus according to claim 15, wherein the one or more second retaining elements are vacuum retaining elements.

19. The apparatus according to claim 16, wherein the one or more third retaining elements are magnetic retaining elements.

20. The apparatus according to claim 1, wherein the cord reinforced ply has a second edge parallel and opposite to the first edge, wherein the apparatus is further arranged for applying a second gum strip to said second edge along a second folding axis (F2) of the apparatus, wherein the apparatus further comprises a second strip support that defines an elongate second strip region (S2) extending in the longitudinal direction (L) for supporting the second gum strip below the second edge at the second folding axis (F2), wherein the second strip, support comprises a second retaining member extending along the second folding axis (F2) on the same side of the second folding axis (F2) as the ply support for retaining a first part of the second gum strip below the second edge and a second folding member that is rotatable with respect to the second retaining member about the second folding axis (F2) from a flat position on the outside of the second retaining member with respect to the ply support into a folding position opposite to the second retaining member with respect to the support plane (P) for folding a second part of the second gum strip around the second edge.

21. The apparatus according to claim 20, wherein the first strip support and the second strip support are movable relative to each other in a lateral direction (E) parallel to the support plane (P) and transverse or perpendicular to the longitudinal direction (L).

22. The apparatus according to claim 21, wherein the ply support has a width (W1, W2) in the lateral direction (E) that is adjustable in response to the movement of the first strip support and the second strip support in said lateral direction (E).

23. The apparatus according to claim 22, wherein the ply support comprises a plurality of ply support members extending in the longitudinal direction (L), wherein said ply support members are distributed in the lateral direction (E) between the first strip support and the second strip support to define the support plane (P) for the cord reinforced ply, wherein the ply support members are movable towards and away from each other in the lateral direction (E).

24. The apparatus according to claim 23, wherein the ply support members are evenly distributed and remain evenly distributed between the first strip support and the second strip support when moving towards away from each other in the lateral direction (E).

25. A method for applying a first gum strip to a first edge of a cord reinforced ply, wherein the method comprises the steps of:
- providing an apparatus as claimed in claim 1,
- receiving the first gum strip at the elongate first strip region (S1) on the first strip support;
- supporting the cord reinforced ply with the first edge extending in the longitudinal direction (L) along the first folding axis (F1) of the apparatus;
- wherein the first part of the first gum strip is retained by the first retaining member below the first edge and the first folding member is rotated with respect to the first retaining member about the first folding axis (F1) from a flat position on the outside of the first retaining member with respect to the ply support into a folding position opposite to the first retaining member with respect to the support plane (P), thereby folding the second part of the first gum strip around the first edge.

26. The method according to claim 25, wherein the first folding member folds the second part of the first gum strip simultaneously along the entire elongate first strip region (S1) of the first strip support.

27. The method according to claim 25, wherein the ply support remains stationary in the longitudinal direction (L) during the folding.

28. The method according to claim 25, wherein the cord reinforced ply has a second edge parallel and opposite to the first edge, wherein the method further comprises the step of applying a second gum strip to said second edge along a second folding axis (F2) of the apparatus.

* * * * *